United States Patent [19]
Rentchler, Jr.

[11] Patent Number: 5,275,466
[45] Date of Patent: Jan. 4, 1994

[54] PORTABLE ARMREST

[76] Inventor: John W. Rentchler, Jr., 9226 Lakewood Dr., Windsor, Calif. 95492

[21] Appl. No.: 938,935

[22] Filed: Sep. 1, 1992

[51] Int. Cl.⁵ ................................ A47C 7/54
[52] U.S. Cl. .................. 297/411.25; 297/411.29
[58] Field of Search ............ 297/191, 414–416

[56] References Cited

U.S. PATENT DOCUMENTS

| | | | |
|---|---|---|---|
| 2,642,926 | 6/1953 | Diamond | 297/415 |
| 2,720,912 | 10/1955 | Light | 297/415 |
| 4,681,366 | 7/1987 | Lobanoff | 297/191 |
| 4,792,183 | 12/1988 | Townsend, III | 297/191 X |
| 5,046,433 | 9/1991 | Kramer et al. | 297/191 X |

Primary Examiner—Peter R. Brown
Attorney, Agent, or Firm—Larry D. Johnson

[57] ABSTRACT

A portable armrest provides a removable apparatus for use with passenger seats having a seat bottom, a seat back, and a headrest portion supported on the seat back by one or more headrest support posts engaged into one or more receiving holes in the seat back. The apparatus includes a top plate portion engageable with the receiving holes in the seat back (e.g., holes for penetration and capture by the headrest support posts, or integral posts for insertion into the receiving holes), a downwardly depending side portion, and an armrest arm portion, and may include a seat back clamp for releasable capture of the side edge of the seat back.

2 Claims, 2 Drawing Sheets

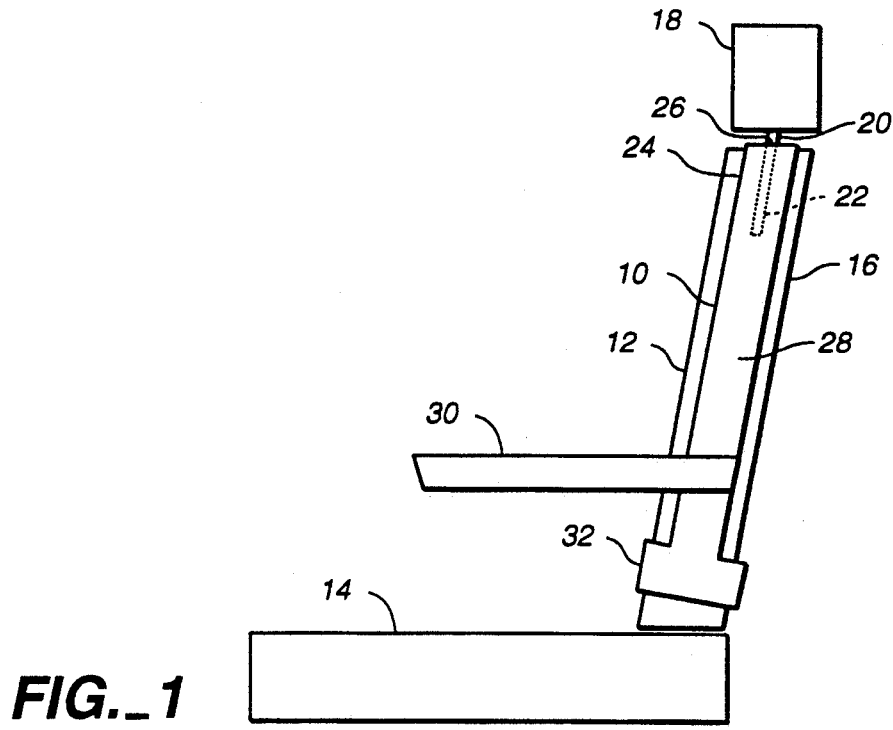
FIG._1
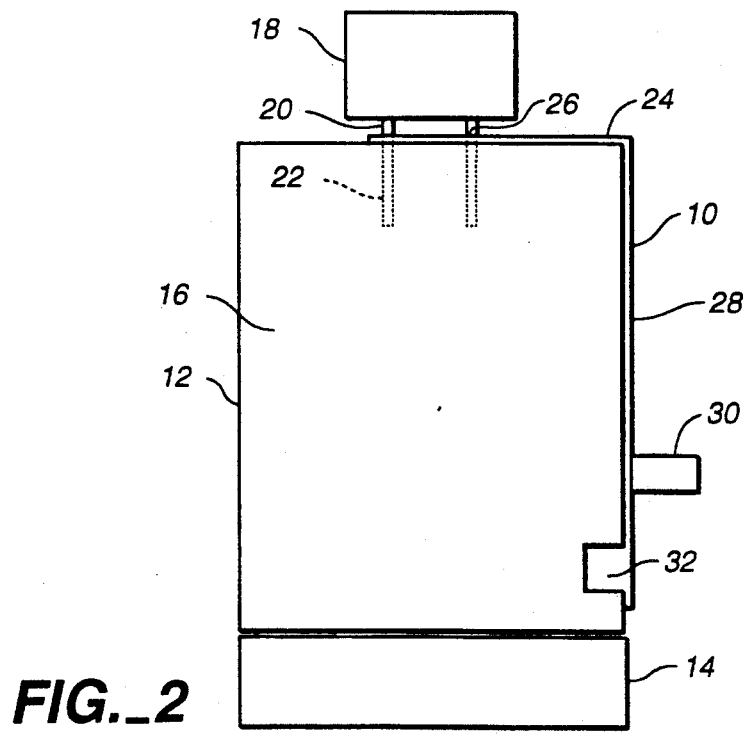
FIG._2

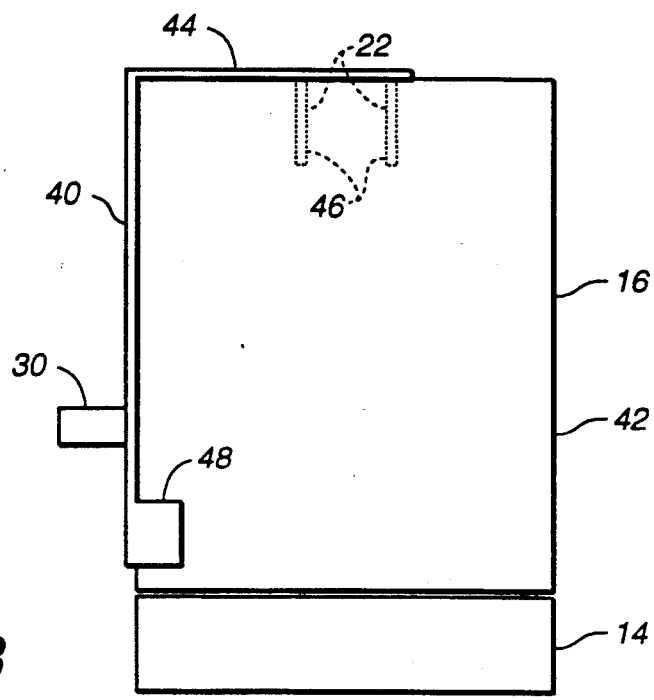
FIG._3
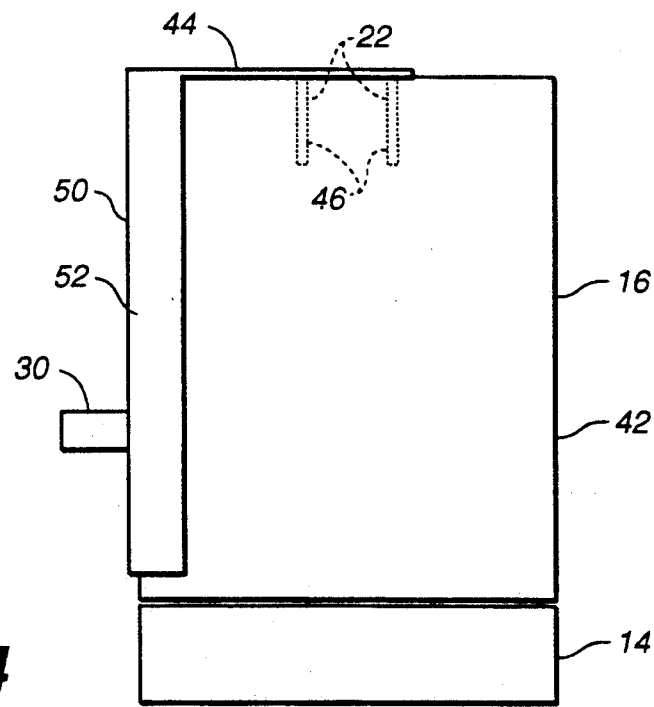
FIG._4

PORTABLE ARMREST

BACKGROUND OF THE INVENTION

1. Field of the Invention

This invention relates generally to seats and other passenger supports, and more specifically to an improved portable armrest apparatus for use with automobile, truck and other passenger seats.

2. Description of the Prior Art

Passenger seats such as those used in automobiles and trucks are well known, and often include an integral armrest on one or both sides of the seat, so that the seat occupant may rest or support his arms. However, many known passenger seats do not include such integral armrests, rendering the seats less comfortable for many users.

Some portable (aftermarket) armrests have been designed for use with such seats. For example, McPartland U.S. Pat. No. 1,378,704 discloses, inter alia, an armrest device that may be suspended from a passenger seat back by use of an adjustable clamp mechanism. Mahon et al. U.S. Pat. No. 3,068,048 discloses an armrest and tray combination that mechanically hooks over the top of the seat back, and is therefore supported in the middle of a bench-type seat. However, due to their attachment methods, no known prior art portable armrests enable selective positioning of an armrest on either side of a bucket-type passenger seat.

SUMMARY OF THE INVENTION

The portable armrest of this invention provides a removable (aftermarket) armrest apparatus for use with passenger seats having a seat bottom, a seat back, and a headrest portion supported on the seat back by one or more headrest support posts engaged into one or more receiving holes in the seat back; the portable armrest apparatus including a top plate portion bearing means for engagement with the receiving holes in the seat back (e.g., holes for penetration and capture by the headrest support posts, or integral posts for insertion into the receiving holes), a downwardly depending side portion, and an armrest arm portion. The inventive apparatus may also include a seat back clamp for releasable capture of the side edge of the seat back.

BRIEF DESCRIPTION OF THE DRAWINGS

FIG. 1 is a right side elevation view of a headrest post-supported embodiment of the portable armrest apparatus of this invention as installed on a typical passenger side automobile seat, this view illustrating the passenger seat including a seat bottom, a seat back, and a headrest portion supported on the seat back by one or more headrest support posts engaged into one or more receiving holes in the seat back; the portable armrest apparatus including a top plate portion bearing holes for penetration and capture by the headrest support posts, a downwardly depending side portion, an armrest arm portion, and a seat back clamp;

FIG. 2 is a front elevation view of the headrest post-supported embodiment of the portable armrest of FIG. 1 again as installed on a typical passenger side seat;

FIG. 3 is a front elevation view of a top plate post-supported embodiment of the portable armrest of this invention as installed on a driver's side seat; and FIG. 4 is a front elevation view of an alternate non-clamping version of a top plate post-supported embodiment of the portable armrest of this invention also as installed on a driver's side seat.

DETAILED DESCRIPTION OF A PREFERRED EMBODIMENT

FIG. 1 is a right side elevation view of a headrest post-supported embodiment 10 of the portable armrest apparatus of this invention as installed on a typical passenger side automobile seat 12, this view illustrating the passenger seat including a seat bottom 14, a seat back 16, and a headrest portion 18 supported on the seat back 16 by one or more headrest support posts 20 engaged into one or more receiving holes 22 in the seat back 16. The portable armrest apparatus includes a top plate portion 24 bearing holes 26 for penetration and capture by the headrest support posts 20, a downwardly depending side portion 28, an armrest arm portion 30, and a seat back clamp 32. Thus, the armrest arm portion 30 is supported from above by the headrest support posts engaging the top plate. The seat back clamp 32 wraps around and releasably captures the side of the seat back 16, providing additional support and stability to the apparatus in use.

In the preferred embodiment (and for ease of manufacture), the armrest arm portion 30 is integral with the side portion 28. The armrest arm portion may desirably be pivotable (adjustable) relative to the side portion. However, if the arm portion were made to be removable, or pivotable by generally 180 degrees, the entire apparatus could be reversible and used on either side of a seat back.

For those seats that include a knob or other feature to control some aspect of the seat support (e.g., lumbar support), the side portion may be bored or otherwise modified to accommodate such features. This connection may lend further support and stability to the overall apparatus in use.

FIG. 2 is a front elevation view of the headrest post-supported embodiment 10 of the portable armrest of FIG. 1 again as installed on a typical passenger side seat 12. The inventive apparatus may be made of any material, and in any appropriate size. The top plate may be made to accommodate headrests with one or more headrest posts, and may be designed with a plurality of holes to fit various headrest support post designs.

Installation of the apparatus is as follows: The seat headrest of the automobile seat is removed, and the top plate of the armrest apparatus is positioned on top of the seat back so that the holes in the top plate line up with the receiving holes in the seat back, and the armrest arm portion extends out from the seat back in the desired orientation. The armrest apparatus seat back clamp is placed around the side edge of the seat back. Finally, the seat headrest is placed onto the seat so that the headrest support posts penetrate the holes in the top plate.

FIG. 3 is a front elevation view of a top plate post-supported embodiment 40 of the portable armrest of this invention as installed on a driver's side seat 42. This embodiment provides top plate 44 with integral posts 46 that are themselves inserted into the receiving holes 22 of seat back 16. Thus, the headrest is completely removed and not replaced on the seat when this armrest apparatus is being used. A seat clamp 48 may be used as described supra.

FIG. 4 is a front elevation view of an alternate non-clamping version 50 of a top plate post-supported embodiment of the portable armrest of this invention also as installed on a driver's side seat 42. This version also utilizes the integral posts 46 described in the embodiment of FIG. 3, but reorients the downwardly-depending side portion 52 so that it rests on the front of the seat back 16, and eliminates the seat clamp. Thus, this version may be used on bench-type seats as well, as there is no interference of the apparatus with the full-width seat back. Alternatively, the apparatus may utilize the headrest post-supported structure (with holes in the top plate portion) as described in FIGS. 1 and 2, supra.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A portable armrest for use with passenger seats having a seat bottom, a seat back, and a headrest portion supported on the seat back by at least one headrest support post engaged into at least one receiving hole in the seat back; the portable armrest comprising:
    a top plate portion bearing means for engagement with said receiving hole in said seat back;
    a downwardly depending side portion attached to said top plate portion and including a seat back clamp for releasable capture of a side edge of said seat back; and
    an armrest arm portion attached to said downwardly depending side portion.

2. A portable armrest for use with passenger seats having a seat bottom, a seat back, and a headrest portion supported on the seat back by at least one headrest support post engaged into at least one receiving hole in the seat back; the portable armrest comprising:
    a top plate portion bearing at least one integral post for insertion into said receiving hole in said seat back;
    a downwardly depending side portion attached to said top plate portion; and
    an armrest arm portion attached to said downwardly depending side portion.

* * * * *